(12) United States Patent
Yanagisawa

(10) Patent No.: US 7,903,048 B2
(45) Date of Patent: Mar. 8, 2011

(54) INFORMATION DISPLAY APPARATUS AND NAVIGATION APPARATUS

(75) Inventor: Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1112 days.

(21) Appl. No.: 11/629,902

(22) PCT Filed: Jun. 16, 2005

(86) PCT No.: PCT/JP2005/011064
§ 371 (c)(1),
(2), (4) Date: Dec. 18, 2006

(87) PCT Pub. No.: WO2005/124431
PCT Pub. Date: Dec. 29, 2005

(65) Prior Publication Data
US 2008/0048932 A1    Feb. 28, 2008

(30) Foreign Application Priority Data
Jun. 18, 2004 (JP) .................................. 2004-181821

(51) Int. Cl.
G09G 5/00 (2006.01)
(52) U.S. Cl. ...................... 345/7; 345/8; 345/9; 345/84
(58) Field of Classification Search ................ 345/7–9, 345/84
See application file for complete search history.

(56) References Cited

U.S. PATENT DOCUMENTS

| | | | | |
|---|---|---|---|---|
| 5,305,012 A | * | 4/1994 | Faris | 345/7 |
| 5,931,888 A | * | 8/1999 | Hiyokawa | 701/208 |
| 6,268,825 B1 | * | 7/2001 | Okada | 342/357.13 |
| 7,199,767 B2 | * | 4/2007 | Spero | 345/7 |
| 7,339,149 B1 | * | 3/2008 | Schofield et al. | 250/205 |

(Continued)

FOREIGN PATENT DOCUMENTS

JP    1-219883 A    9/1989

(Continued)

OTHER PUBLICATIONS

Japanese Patent Office issued a Japanese Office Action date Dec. 8, 2009, Application No. 2006-514788.

Primary Examiner — Alexander Eisen
Assistant Examiner — Viet Pham
(74) Attorney, Agent, or Firm — Young & Thompson

(57) ABSTRACT

In an information display apparatus such as a head-up display, while safety is being secured, visibility from a user is improved. Image data having an object such as an arrow showing an advancing direction or a road sign drawn on it are generated as information to be given to the user by a display information generating section 12 and is output to a projector 13. When a light beam R1 corresponding to the image data is emitted from the projector 13 to a combiner 14, reflected light of the light beam R1 and transmitted light of external light R2 are combined in the combiner 14, so as to be viewed by the user. At this time, the display information generating section 12 outputs coordinate values showing a display position of the object to a transmittance control section 16, and the transmittance control section 16 specifies a display region of the object based on the coordinate values, and reduces the transmittance in the specified region of the light control panel 15 so as to reduce a transmitting amount of the external light R2.

16 Claims, 12 Drawing Sheets

U.S. PATENT DOCUMENTS

2002/0152021 A1* 10/2002 Ota et al. .................... 701/208
2004/0143387 A1* 7/2004 Shimizu et al. ............... 701/209

FOREIGN PATENT DOCUMENTS

| | | | |
|---|---|---|---|
| JP | 2-15524 | | 1/1990 |
| JP | 5-104980 | A | 4/1993 |
| JP | 08-160340 | * | 5/1994 |
| JP | 8-076050 | A | 3/1996 |
| JP | 8-160340 | A | 6/1996 |
| JP | 08-253059 | | 10/1996 |
| JP | 2003-149730 | A | 5/2003 |
| JP | 2003-341383 | | 12/2003 |

* cited by examiner

INFORMATION DISPLAY APPARATUS AND NAVIGATION APPARATUS

The entire disclosure of the Japanese Patent Application No. 2004-181821 filed on Jun. 18, 2004 and including the specification, the claims, the drawings and the abstract is incorporated herein by reference in its entirety.

TECHNICAL FIELD

The present invention relates to an information display apparatus which displays various information to be presented to users, and particularly relates to a see-through type information display apparatus which overlaps various information on a real landscape viewed by users so as to display them.

BACKGROUND ART

Conventionally, for example, in mobile objects such as vehicles and airplanes, so-called head-up displays, which present various information such as texts and speedometers showing progression speed to drivers through windshields, are put to practical use. A representative example of such head-up displays is such that a light beam is emitted from a projecting apparatus such as a projector to a combiner composed of a half mirror or HOE (Holographic Optical Element), and various information is presented to a user by using reflected light from the combiner.

However, in such a head-up display, since the emitted light from the projector and external light are combined by the combiner, when the luminance of the external light is heightened, there is the possibility of difficulty in viewing information projected onto the combiner. For example, when the head-up display is tried to be used in the daytime where the irradiation amount of natural light is large, there is the possibility of difficulty in viewing projected information due to an influence of the natural light. Further, even during evening hours, for example, there is the possibility of difficulty in viewing projected information due to an influence of a headlight of an oncoming car or the like. Therefore, conventionally, for example, it is proposed that a light control apparatus for adjusting the transmission amount of external light is provided onto the combiner, the light amount of the external light transmitting through the combiner is adjusted, and thus deterioration in visibility of information due to the external light is prevented (see Patent Document 1).

Patent Document 1: Japanese Patent Application Laid-Open (JP-A) No. 5-104980

DISCLOSURE OF THE INVENTION

Problem to be Solved by the Invention

However, since the head-up display disclosed in Patent Document 1 only uniformly reduces the transmission light amount of the entire combiner, the visibility of the external world via the combiner is reduced over the entire combiner. For this reason, when the combiner is provided to windshield portions of vehicles and airplanes, it is difficult to enlarge the combiner from the viewpoint of securing safety of vehicle run.

The present invention is devised in consideration of the above problem, and its object is to provide an information display apparatus and a navigation apparatus such as a head-up display which are capable of realizing enlargement of a display apparatus such as a combiner, securing safety and improving visibility from users.

Means for Solving the Problems

To solve the above-mentioned problems, according to a first aspect of the invention, there is provided an information display apparatus which displays notification information to be given to the user, characterized by comprising: a display means which is consisted of a base material for transmitting a visible light beam and is provided with a display surface for displaying the notification information with it being opposed to an incident surface of the visible light beam; a light control means which is arranged so as to be overlapped with the incident surface of the display means, controls luminance of the visible light beam incident to the incident surface and is formed by a base material having transparency, and changes light transmittance for each region obtained by dividing a range overlapped with the display means; a display control means which generates data including the notification information as image data and controls display of the information in the display means; a specifying means which specifies a display position of the information on the display means and specifies the region of the light control means corresponding to the display position; and a transmittance control means which controls the light control means so as to reduce the light transmittance in the specified region.

According to a fourteenth aspect of the invention, there is provided a navigation apparatus which displays route guiding information necessary for route guiding due to a movement of a mobile object, characterized by comprising: a display means which is composed of a base material for transmitting a visible light beam and is provided with a display surface for displaying the route guiding information with it being opposed to an incident surface of the visible light beam; a light control means which is arranged so as to be overlapped with the incident surface of the display means, controls luminance of the visible light beam incident to the incident surface and is formed by a base material having transparency, and changes light transmittance in each of regions obtained by dividing a range overlapped with the display means; a recording means which records image data including the route guiding information in it; a display control means which controls display of the route guiding information in the display means based on the image data recorded in the recording means; a specifying means which specifies a display position of the route guiding information on the display means and specifies the region of the light control means corresponding to the display position; and a transmittance control means which controls the light control means so as to reduce the light transmittance in the specified region.

DESCRIPTION OF REFERENCE NUMERALS

Figure 1:
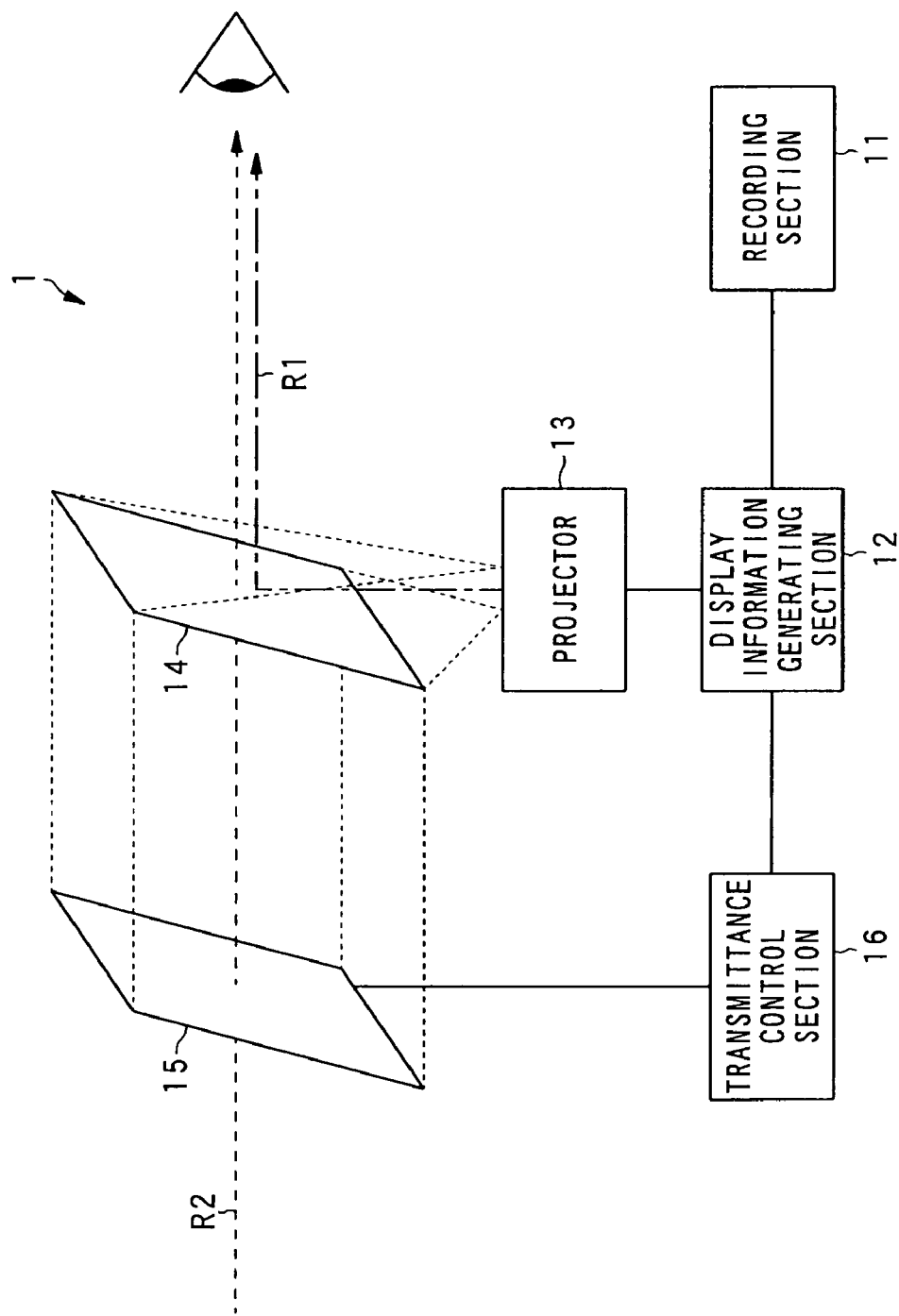
FIG. 1 is a block diagram illustrating a constitution of an information display apparatus I according to a first embodiment.

I, I2, I3, I4 Information display apparatus
11 Recording section
12 Display information generating section
13 Projector
14 Combiner
15 Light control panel
16 Transmittance control section
17 Display panel
18 External light luminance distribution detecting section
19 Overlapped video picture imaging section
20 Video picture analyzing section
100 Navigation apparatus

BEST MODE FOR CARRYING OUT THE INVENTION

[1] First Embodiment

[1.1] Constitution of First Embodiment (1) Constitution of Information Display Apparatus An information display apparatus I according to an embodiment is explained with reference to FIG. 1. As shown in FIG. 1, the information display apparatus I according to the embodiment has a recording section 11, a display information generating section 12, a projector 13, a combiner 14, a light control panel 15 and a transmittance control section 16.

In the information display apparatus I according to the embodiment, when an image having an object showing information contents drawn on it is projected from the projector 13 to the combiner 14, transmittance of external light R2 in an object display region is reduced by the light control panel 15, and user's visibility of the object is secured.

The recording section 11 is composed of, for example, a recording apparatus such as HD (Hard Disk) drive, and records data for displaying texts and objects such as polygon and polyline and data for displaying a real picture video picture. The display information generating section 12 generates image data for displaying various objects corresponding to information to be given to a user such as an arrow or a text based on various data recorded in the recording section 11, and outputs the image data to the projector 13.

Specific contents of the image data generated in the display information generating section 12 are arbitrary. For example, when the information display apparatus I is installed in a vehicle, it may generate image data for displaying an arrow showing an operating state of turn signal and a speedometer according to turning On/Off of a turn signal switch by a user and an input value from a speed sensor. Further, image data for displaying character string such as "Turn right 30 m ahead" and an arrow showing an advancing direction (hereinafter, "route guiding information") may be created based on a control signal supplied from the navigation apparatus in conjunction with the navigation apparatus. Further, image data corresponding to a real picture video picture may be generated. A constitutional example in the case of conjunction with the navigation apparatus is explained later.

Further, for example, when an arrow showing the operating state of the turn signal is displayed, a display position of the arrow may be predetermined, or may be changed according to user's support. Further, the size of the objects to be displayed is arbitrary, and the size of the objects to be displayed may be predetermined, and the user may select the object size.

However, as to a region other than the display region of the information to be given to the user, namely, the object, for example, it is necessary that image data drawn with black are generated and a viewing range of the user is secured via the combiner 14.

The projector 13 has, for example, a light source and a liquid crystal panel, drives the liquid crystal panel based on image data input from the display information generating section 12, and emits a light beam R1 corresponding to the image data to the combiner 14.

The combiner 14 is composed of, for example, a half mirror or HOE, and transmits apart of the external light R2 and reflects the light beam R1 emitted from the projector 13. As a result, the part of the external light R2 transmitted through the combiner 14 and the reflected light of the light beam R1 emitted by the projector 13 are combined by the combiner 14 so as to be viewed by the user.

The light control panel 15 is composed of a transmission type liquid crystal panel 15, and the transmittance is changed due to application or removal of a voltage. The light control panel 15 is formed integrally with the combiner 14, is arranged on an incident surface side of the external light R2 with respect to the combiner 14, and the transmittance is changed so that the light amount of the external light R2 incident to the combiner 14 is controlled.

As mentioned above, since the reflected light of the light beam R1 emitted from the projector 13 and the transmitted light of the external light R2 are combined by the combiner 14 so as to be viewed by the user, when the transmittance of the external light R2 in the light control panel 15 is reduced uniformly on the entire panel surface, it is difficult to secure the user's visual field via the combiner 14. In the embodiment, therefore, the light control panel 15 is divided into a plurality of regions (hereinafter, the regions are referred to as "cells"), and the transmittance can be changed in each cell. According to the shape and display position of the information to be given to the user, namely, the object, the transmittance is reduced only in cells including the projecting region of the object, and while the user's visual field via the combiner 14 is being secured, the visibility of the object is improved. "The region" in "claims" corresponds to, for example, "the cell".

Figure 2:
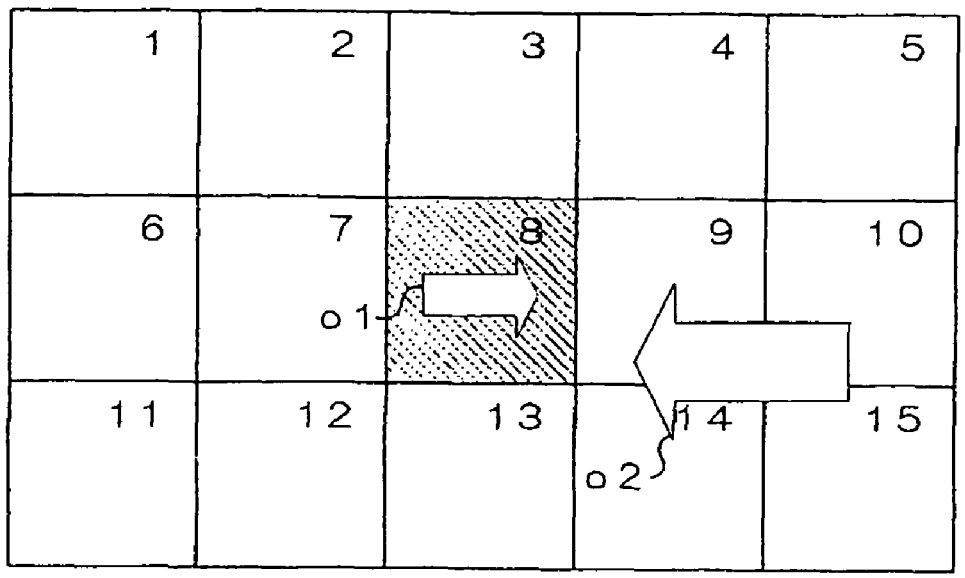
FIG. 2 is a diagram illustrating a dividing method of a light control panel 15 according to the first embodiment.

For example, the case where the light control panel 15 is divided into cells of a dice shape "1 to 15" shown in FIG. 2 (hereinafter, these numbers are referred to as "cell numbers") is considered. In this constitution, when, for example, an arrow o1 is projected as the object onto the combiner 14, the transmittance of the cell "8" including the arrow o1 in the light control panel 15 is reduced, and the visibility of the arrow is improved. Further, it is also considered that the shape and the display position of the object based on the image data generated in the display information generating section 12 are changed. For example, in the example shown in FIG. 2, when the display position and the shape of the arrow o1 are changed into the arrow o2, the cells including the arrow o2 are changed to four cells "9", "10", "14" and "15". In such a manner, when the display position and the shape of the object are changed, the transmittance of the cell "8" is heightened, and the transmittance of the four cells is reduced.

Figure 3:
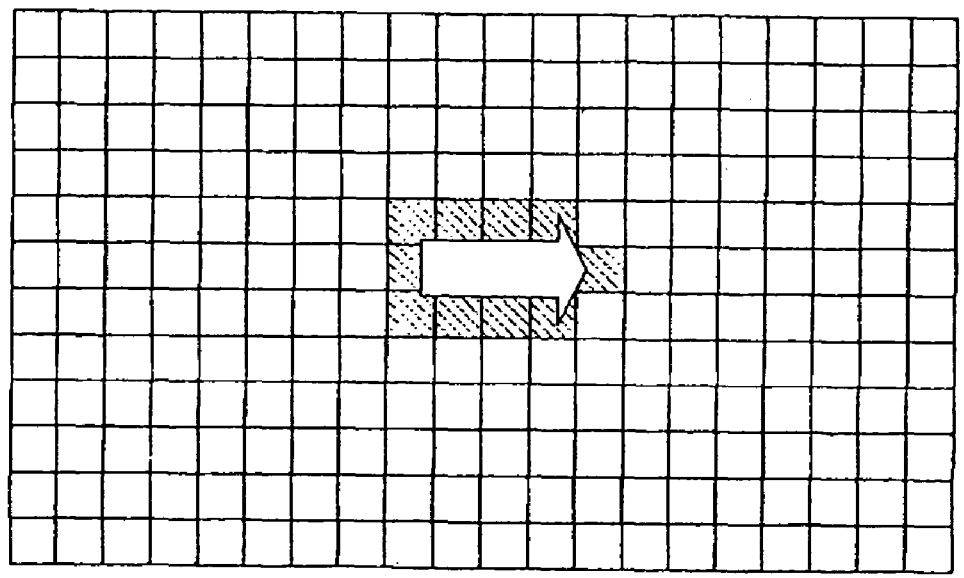
FIG. 3 is a diagram illustrating a dividing method of the light control panel 15 according to the first embodiment.

The specific dividing form of the cells is arbitrary, and as shown in FIG. 3, for example, the light control panel 15 is divided into more fine cells and the transmittance of the plural cells including the information (object) given to the user may be reduced simultaneously, or resolution similar to that of the projector 13 is provided to the light control panel 15 and one pixel in the projector 13 may be related to one cell in the light control panel 15. The specific constitution of the light control panel 15 for realizing such a function is explained later.

In the case where only the transmittance of the cells corresponding to the region to which the object is projected is reduced like the embodiment, it is necessary to establish a corresponding relationship of coordinates among the projector 13, the combiner 14 and the light control panel 15. For example, the case where the coordinate on the liquid crystal panel installed in the projector 13 is designated by (x', y'), the coordinate on the combiner 14 within the projectable range is designated by (x, y), and the coordinate on the light control panel 15 is designated by (X, Y) is considered.

As mentioned later, the display information generating section 12 in the embodiment generates image data on the basis of the coordinate (x, y) on the combiner 14, but since the relationship between (x', y') and (x, y) changes depending on a distance between the combiner 14 and the projector 13, if (x', y') and (x, y) are not related to each other in advance, the display position of the object on the liquid crystal panel is not related to the display position on the combiner 14.

Further, the coordinate (x, y) on the combiner 14 does not match with the coordinate (X, Y) on the light control panel 15, the position on the light control panel 15 corresponding to the display position of the object cannot be specified. Further, when the value of the coordinate (X, Y) included in the cells of the light control panel 15 cannot be specified, the cells to which the specified coordinate (X, Y) belongs cannot be specified.

When the display information generating section 12 in the embodiment generates the image data based on data recorded in the recording section 11, it calculates a coordinate (x, y) group on the combiner 14 included in the region where the information to be presented to the user in an image corresponding to the data, namely, the object is displayed. Further, the recording section 11 records the data such as the polygon, tables for specifying the coordinate (x', y') and the coordinate (X, Y) based on the coordinate (x, y) (hereinafter, refereed to as "xx' translation table" and "xX translation table"), and a cell specifying table for specifying cell numbers on the light control panel 15 based on the coordinate (X, Y) in it.

When the object is displayed on the information display apparatus I, (x', y') and (X, Y) corresponding to the coordinate (x, y) group calculated in the display information generating section 12 are specified based on these tables, and the cell number specifying table is searched based on the specified coordinate (X, Y), so that the cells whose transmission should be reduced are specified. Such a constitution is adopted.

The form of the coordinate group generated by the display information generating section 12 at this time is arbitrary, and for example, all coordinate values included in the display region of the object may be put into a table form, or feature points are (for example, points to be apexes of corners of an arrow) are determined in advance for the object, so that coordinate values of the feature points may be calculated.

(2) Specific Constitution of Light Control Panel 15

Figure 4:
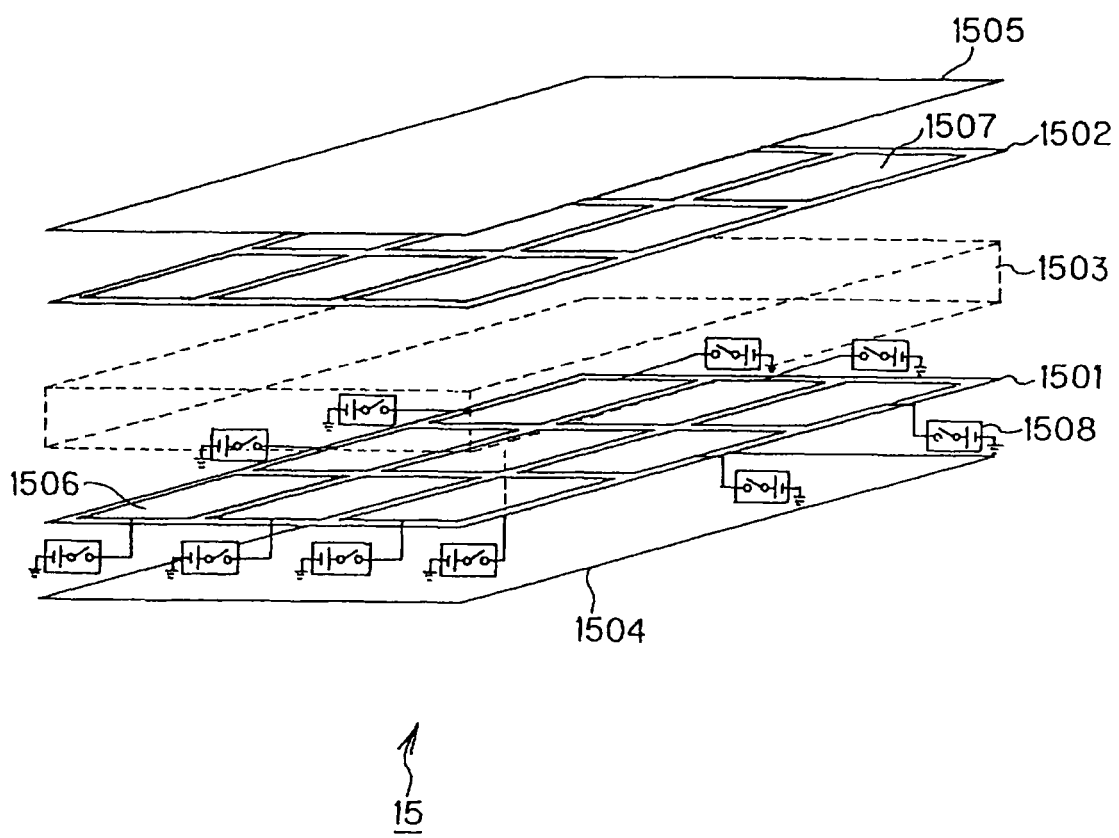
FIG. 4 is a diagram illustrating a constitutional example in the case where the light control panel 15 is constituted as a segment type liquid crystal panel in the first embodiment.

The specific constitution of the light control panel 15 is explained below with reference to FIGS. 4 and 5. FIG. 4 is a perspective view illustrating a constitutional example of the light control panel 15 in the case where a segment system is adopted, and FIG. 5 is a perspective view illustrating a constitutional example of the light control panel 15 in the case where an active matrix system composed of TFT (Thin Film Transistor) is adopted.

As shown in FIG. 4, when the segment system is adopted, the light control panel 15 is constituted so that an element substrate 1501 and a counter substrate 1502 are laminated with a gap and liquid crystal 1503 is filled between both the substrates 1501 and 1502. Both the substrates 1501 and 1502 are composed of transparent materials such as SiO2 having high transparency in order to secure transmittance of the external light R2, and are provided with polarization films 1504 and 1505. Further, transparent electrodes 1506 and 1507 having a shape corresponding to the cells are formed on counter surfaces of the substrates 1501 and 1502 and are arranged so as to be opposed via the liquid crystal layer 1503. Further, the electrode 1507 on the side of the counter substrate 1502 is connected to a reference voltage, and the electrode 1506 on the side of the element substrate 1501 is connected to a reference voltage via a switch 1508. As a result, a potential difference is generated between the substrates 1501 and 1502 and the electrodes 1506 and 1507 in a state that the switch is OFF, the liquid crystal 1003 present between the electrodes 1506 and 1507 is oriented in one direction, the transmittance is improved due to an interaction between the polarization films 1504 and 1505, and the orientation of the liquid crystal becomes random at the time when the switch 1508 is turned ON so that the transmittance is reduced. When this system is adopted, the switch 1508 provided correspondingly to the electrodes 1506 and 1507 is switched between On and OFF by the transmittance control section 16, and thus the transmittance in the regions corresponding to the cells on the light control panel 15 is changed.

Figure 5:
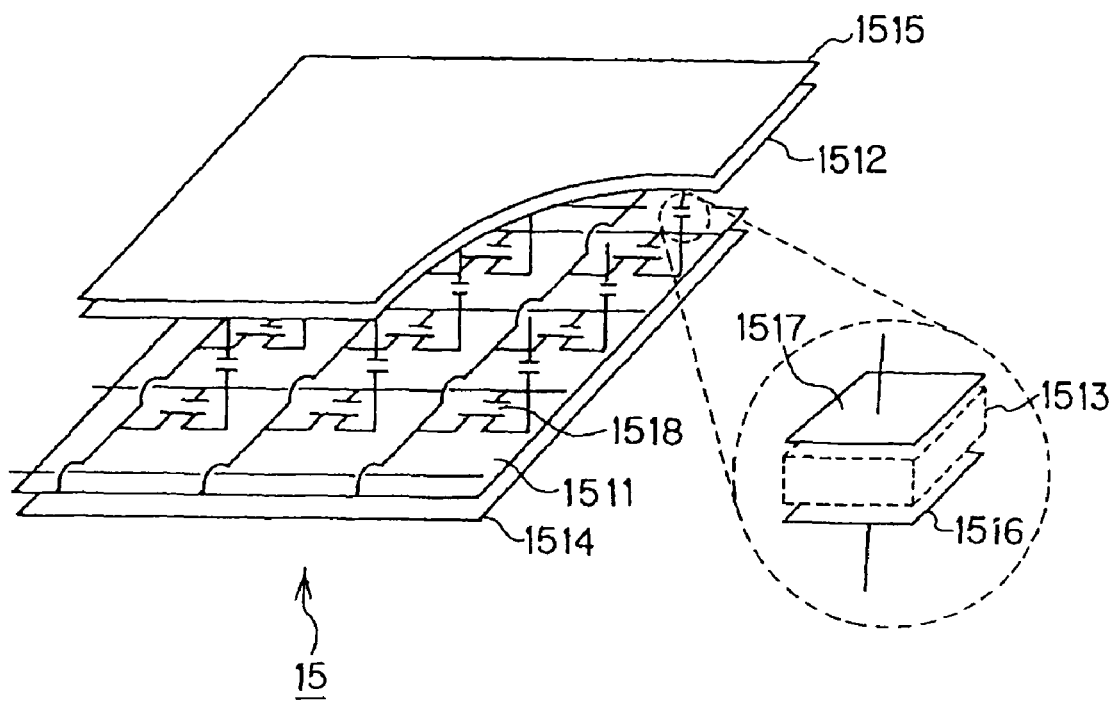
FIG. 5 is a diagram illustrating a constitutional example in the case where the light control panel 15 is constituted as an active matrix type liquid crystal panel in the first embodiment.

On the contrary, when the active matrix system is adopted, the light control panel 15 is constituted as shown in FIG. 5 so that the element substrate 1511 and the counter electrode 1512 provided with the polarization films 1514 and 1515 are laminated with their gap being held and liquid crystal 1513 is filled between the substrates 1511 and 1512. Transparent common electrodes 1517 are formed on the counter substrate 1512, and transparent element electrodes 1516 corresponding to the cells are arranged on the element substrate 1151 into a matrix pattern. The element electrodes 1516 are connected to drains of MOSFETs 1518, and their gates are connected to scanning lines, and their sources are connected to data lines. When a signal is input from the scanning lines to the MOSFETs 1518, The MOSFETs 1518 are switched between ON and OFF according to the input signals, and when the signals are input from the data lines in the ON state, electric charges corresponding to the signals are held between the element electrodes 1516 and the common electrodes 1517. As a result, the orientation of the liquid crystal present between both the electrodes changes, and the transmittance of the regions corresponding to the cells changes due to the interaction between the polarization films 1514 and 1515. When this method is adopted, the transmittance control section 16 controls the signals to the data lines and the common electrodes so as to change the transmittance of the external light R2 in some regions on the light control panel 15.

Since the constitution and the driving method of the light control panel 15 are similar to those of the conventional liquid crystal panels except for that the respective transparent electrodes are formed correspondingly to the cells, their details are omitted. The liquid crystal panel composing the light control panel 15 may adopt the above systems and also another methods such as a simple matrix driving system.

[1.2] Operation in First Embodiment

Figure 6:
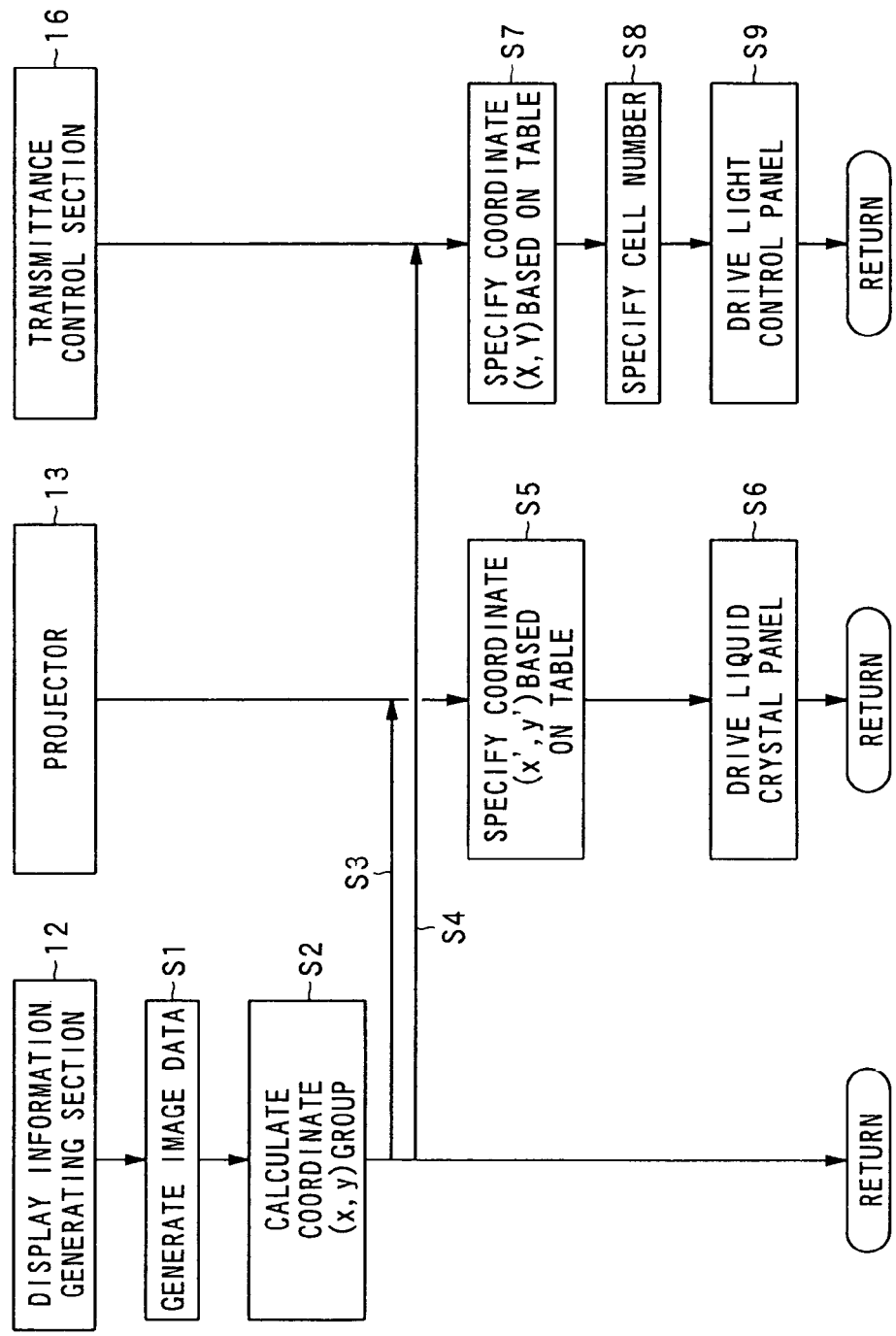
FIG. 6 is a sequence chart illustrating a process executed when an image for one frame is displayed on the information display apparatus I according to the first embodiment.

The operation of the information display apparatus I according to the embodiment is explained below with reference to FIG. 6. FIG. 6 is a sequence chart illustrating the process executed when an image for one frame is displayed on the information display apparatus I according to the embodiment.

In this process, the display information generating section 12 reads data such as a polygon recorded in the recording section 11, and generates image data having an object to be displayed on the combiner 14 drawn based on the read data (step S1). After the generation of such image data, the display information generating section 12 calculates the coordinate (x, y) group for specifying the display position of the object drawn in the image data (step S2), and outputs the calculated coordinate (x, y) group and the image data generated at step S1 to the projector 13 and the transmittance control section 16 (steps S3 and S4). At this time, the form of the coordinate (x, y) group calculated in the display information generating section 12 is arbitrary as mentioned above.

When the coordinate (x, y) group and the image data are supplied from the display information generating section 12, the coordinate (x', y') group on the liquid crystal panel corresponding to the coordinate (x, y) group is read from the xx' translation table recorded in the recording section 11 in the projector 13 (step S5). The projector 13 drives the liquid crystal panel based on the image data supplied from the display information generating section 12 and the specified coordinate (x, y) (step S6). As a result, the light beam R1 emitted from the projector 13 to the combiner 14 is changed into the object drawn in the image data generated in the display information generating section 12, namely, an object corresponding to information to be presented to a user, and the object is displayed on a position on the combiner 14 corresponding to the coordinate (x, y) group.

On the other hand, the transmittance control section 16, to which the image data and the coordinate (x, y) group are supplied from the display information generating section 12, reads the coordinate (X, Y) on the light control panel 15 corresponding to the coordinate (x, y) group from the xX translation table recorded in the recording section 11 (step S7), and searches the cell specifying table based on the read coordinate (X, Y) so as to specify cell numbers corresponding to the coordinate (X, Y) (step S8). At this time, the transmittance control section 16 reads the coordinate (X, Y) corresponding to all the coordinate values included in the coordinate (x, y) group supplied from the display information generating section 12, so as to specify all the cell numbers including the coordinate (X, Y).

The transmittance control section 16 controls the light control panel 15, so as to reduce the transmittance of the cells corresponding to all the cell numbers specified at step S8.

When the above process is executed, the light beam R1 corresponding to the image of the frame to be displayed is projected onto the combiner 14, and the transmittance of the cells corresponding to the display position of the object on the combiner 14 is reduced. As a result, the luminance of the external light R2 transmitting through the light control panel 15 and incident to the combiner 14 is reduced, and the visibility of the image corresponding to the light beam R1 is improved.

Thereafter, when a series of the process is repeated, the respective objects drawn in the respective frames to be displayed are sequentially displayed on the combiner, and at the time when the frame to be displayed is not present, the process is ended.

The information display apparatus I according to the embodiment displays the information to be given to the user, namely, the object on the light transmitting panel provided in a user's viewing range, and is constituted so as to include the combiner 14 which is composed of a base material for transmitting the external light R2 and is provided with the display surface for displaying the object opposed to the incident surface of the external light R2, the light control panel 15 which is provided so as to be overlapped with the incident surface of the external light R2 of the combiner 14, adjusts the luminance of the external light R2 incident to the incident surface, is formed by the base material having transparency and whose transmittance is changed for respective cells obtained by dividing the panel, the display information generating section 12 which generates data including the object as the image data and controls the display of the object on the combiner 14, and the transmittance control section 16 which specifies the display position of the object on the combiner 14, specifies the cells of the light control panel 15 corresponding to the display position, and controls the light control panel 15 so as to reduce the transmittance of the specified cells.

With this constitution, only the transmittance of the cells corresponding to the projecting position of the object with respect to the combiner 14 is selectively reduced. For this reason, for example, even in the case where the combiner 14 is provided as a head-up display of a vehicle onto the entire surface of the windshield of the vehicle, the safety is secured and simultaneously the visibility of the object from the user can be improved.

Further, in the information display apparatus I in the embodiment, the light control panel 15 is composed of the liquid crystal panel formed by two or more transparent substrates, a plurality of transparent electrodes formed on counter surfaces of the substrates correspondingly to the cells and a liquid crystal material filled between both the substrates, and the transmittance control section 16 controls application of a voltage to the transparent electrodes so as to reduce the light transmittance of the cells on the light control panel 15. For this reason, the ranges of the cells are arbitrarily determined, and the regions whose transmittance is controlled can be adjusted.

Further, the information display apparatus I according to the embodiment further has the projector 13 for emitting the light beam R1 including the object to the reflecting surface of the combiner 14 based on the image data generated by the display information generating section 12, and the combiner 14 reflects the light beams R1 on the reflecting surface so as to display the object. With this constitution, the light beam R1 emitted from the projector 13 is projected onto the combiner 14 so as to be viewed by the user.

For this reason, the viewing position of a virtual image corresponding to the object can be adjusted according to an emitting distance of the light beam R1, and for example, the movement of a focal distance in the case where the combiner 14 is installed on the windshield of the vehicle can be restrained as small as possible.

Further, in the information display apparatus I according to the embodiment, the xX translation table and the cell specifying table for storing information for relating the object display position on the combiner 14 to the cells on the light control panel 15 overlapped with the display position and viewed by the user are prepared, and the transmittance control section 16 specifies the cells on the light control panel corresponding to the display position of the object on the combiner 14 based on the tables. For this reason, even when the display position of the object is changed, the cells corresponding to the position are specified as needed, so that the transmittance of the cells can be reduced.

The case where the liquid crystal panel is used as the light control panel 15 in the information display apparatus I according to the first embodiment is explained, but as the light control panel 15, any panels such as a panel using an electrochromic material for enabling the transmittance of the external light R2 to be changed by means of an applied voltage and a panel for enabling the transmittance of the external light R2 to be changed while a part of the external light R2 is allowed to be transmitted like a transmission type organic EL (Electro Luminescent) panel may be used.

The transmittance control section 16 in the first embodiment adopts the constitution for specifying the cells corresponding to the display position of the object using the xX translation table and the cells specifying table recorded in the recording section 11. However, the cells corresponding to the display position of the object can be specified directly based on the coordinate (x, y) group supplied from the display information generating section 12. When such a constitution is adopted, the table for specifying the cells is recorded in the recording section 11 based on the coordinate (x, y), and the cells may be specified by using the table.

[1.3] Modified Example of First Embodiment (1) Modified Example 1

In the information display apparatus I according to the first embodiment, the combiner 14 and the light control panel 15 are constituted integrally. However, the combiner 14 and the light control panel 15 are formed separately, and can be arranged with a gap being provided therebetween.

Figure 7:
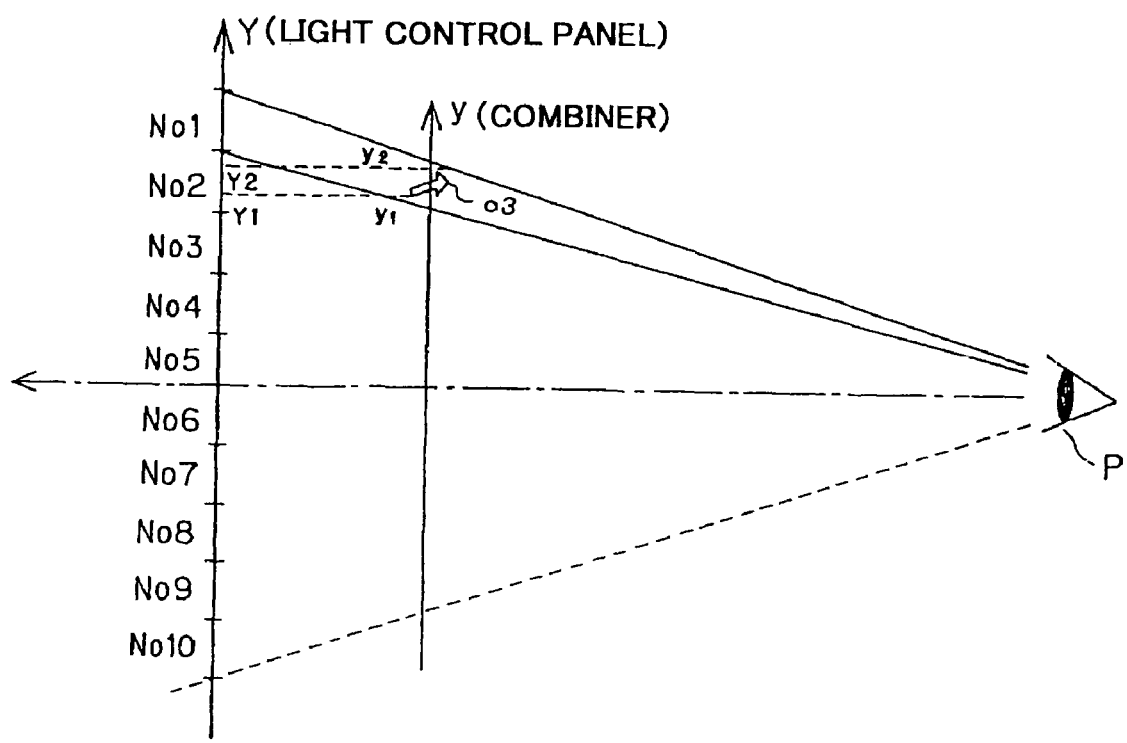
FIG. 7 is a diagram illustrating a relationship between an object o3 observed from a visual point P and cells in the case where a combiner 14 and the light control panel 15 are arranged with a gap in the information display apparatus I according to a modified example 1 of the first embodiment.

When such a constitution is adopted, it is necessary to generate the xX translation table while an attention is being paid to the following point in comparison with the integral constitution. As shown in FIG. 7, the case where the object o3 projected onto the combiner 14 is viewed from the user's viewing position P is considered. In FIG. 7, for easy understanding, only y and Y axial directions in the coordinate (x, y) of the combiner 14 and the coordinate (X, Y) of the light control panel 15 are shown.

In the case of FIG. 7, the coordinate group (y1 to y2) corresponding to the display position of the object o3 on the combiner 14 is the coordinate (Y1 to Y2) corresponding to the cell "2" of the light control panel 15. When a gap is present between the combiner 14 and the light control panel 15, the object o3 is overlapped with the cell "1" on the light control panel 15 so as to be viewed from the actual user's viewing position P. This is applied also to the x and X axial directions.

Therefore, when the xX translation table is created, it is necessary to determine the corresponding relationship between the coordinate (x, y) on the combiner 14 and the coordinate (X, Y) on the light control panel 15 based on the positional relationship between the actual viewing position P from the user and the arrangement positions of the combiner 14 and the light control panel 15. The method of determining the actual corresponding relationship is arbitrary, the coordinates (X, Y) on the light control panel 15 corresponding to the respective coordinates (x, y) on the combiner 14 may be visually determined.

According to this modified example, even when the combiner 14 and the light control panel 15 are arranged with a gap, the cells corresponding to the object display position of the combiner 14 are securely specified and the transmittance is reduced, so that the visibility of the object can be improved.

(2) Modified Example 2

Like the modified example 1, when the combiner 14 and the light control panel 15 are arranged with a gap, in order to match the coordinate (x, y) on the combiner 14 with the coordinate (X, Y) on the light control panel 15, it is necessary that the user's viewing position P does not greatly fluctuate. Therefore, when the combiner 14 and the light control panel 15 are provided, for example, to the windshield of a vehicle and are viewed from a driver's seat, no problem arises, but when the user's viewing position greatly fluctuates, both the coordinates occasionally do not match with each other.

When the apparatus is used under such an environment, the following methods should be adopted.

<Method 1>

On the condition that the user's viewing position P changes, the corresponding relationship between the coordinate (x, y) on the combiner 14 and the coordinate (X, Y) on the light control panel 15 in the case of viewing from respective positions to be the viewing position P is specified. The xX translation tables are created for the respective viewing positions P based on the specified corresponding relationship and are recorded in the recording section 11. When the information display apparatus I is actually used, the user's viewing position P is determined in advance, and is registered in the information display apparatus I. When the object is displayed, the xX translation table and the cell specifying table corresponding to the registered viewing position P are used so that the cells whose transmittance should be reduced are specified.

<Method 2>

Figure 8:
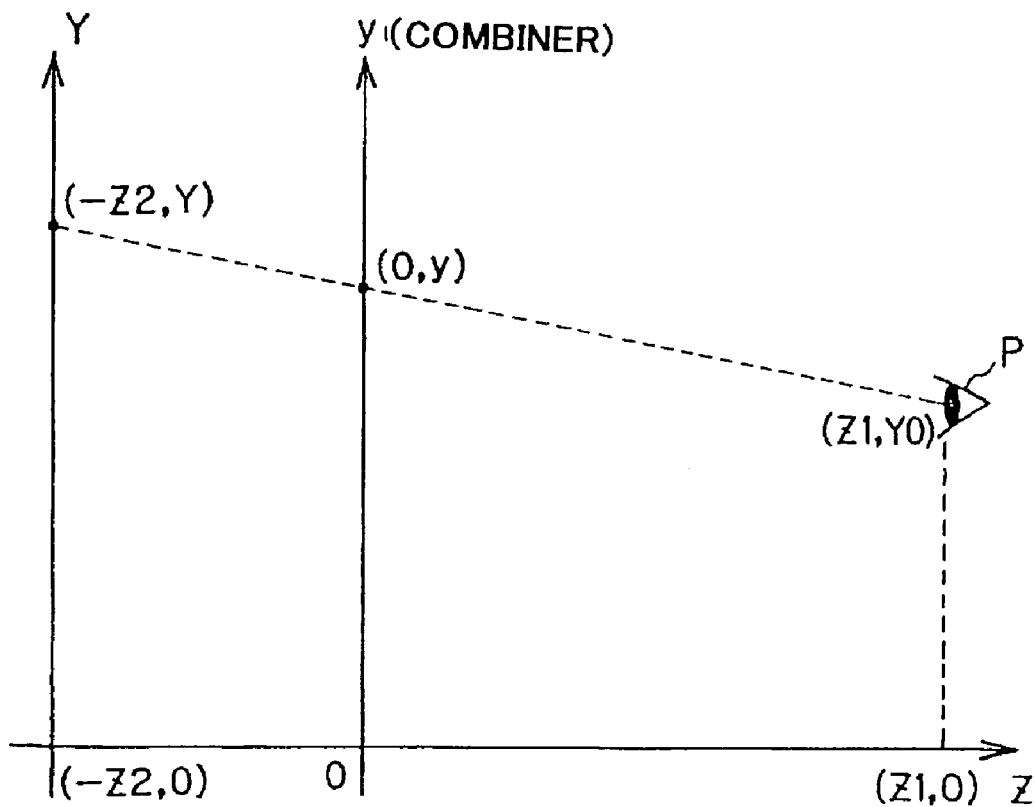
FIG. 8 is a diagram illustrating a positional relationship between the viewing position P and the combiner 14 and the light control panel 15 in the case where the combiner 14 and the light control panel 15 are arranged with a gap in the information display apparatus I according to a modified example 2 of the first embodiment.

This method is for using that a relative position relationship between the combiner 14 and the light control panel 15 is fixed so as to create the xX translation table at the time of starting the use of the information display apparatus I. The case of FIG. 8 is firstly considered. In the drawing, the providing position of the combiner 14 is set as Z=0, the viewing position P is set as Z=Z1 and the providing position of the light control panel 15 is set as Z=−Z2.

In this case, when the point on the combiner 14 which is viewed by the user from the viewing position P (Z1, Y0) is set to (0, y), the point (−Z2, 0) on the light control panel is viewed. In this case, a relationship:

$$Y = \left(1 + \frac{Z2}{Z1}\right)y - \frac{Y0 \times Z2}{Z1} \quad \text{(Formula 1)}$$

is established. Therefore, a relationship between Y and y can be calculated when values Z1, Z2 and Y0 become clear. Since the distance between the combiner 14 and the light control panel 15 is determined by the providing positions, the user's viewing position P is specified and the position P is assigned to the (Formula 1), so that the relationship between the coordinate value y and the coordinate value Y can be determined. This is applied also to the x and X axial directions.

According to this method, when the information display apparatus I is used, the user measures the distance between the viewing position P and the combiner 14 in advance and registers the measured value into the information display apparatus I. When the registered measured value is assigned to the (formula 1), the xX translation table is created, and the cells whose transmittance should be reduced can be specified by using the xX translation table.

According to this modified example, in the case where the combiner 14 and the light control panel 15 are arranged separately, (1) the xX translation table for storing information for relating the cells on the light control panel 15 viewed by the user to the object display position is prepared for each of different viewing positions, and after the user's viewing position is specified, the cells corresponding to the display position of the object on the combiner 14 are specified by using the xX translation table corresponding to the viewing position, or (2) information for relating the object display position to the cells which are overlapped with the display position and are viewed by the user is generated according to the distances from the user's viewing position to the light control panel 15 and the combiner 14 on the basis of the (formula 1), so that the cells are specified based on the information.

With these constitutions, even when the user's viewing position changes, the cells, which are overlapped with the object and are viewed from the changed viewing position P, are specified. For this reason, the coordinate on the combiner 14 which changes according to the movement of the user's visual point is related with the coordinate on the light control panel 15, so that the cells whose transmittance should be reduced can be securely specified.

(3) Modified Example 3

Figure 9:
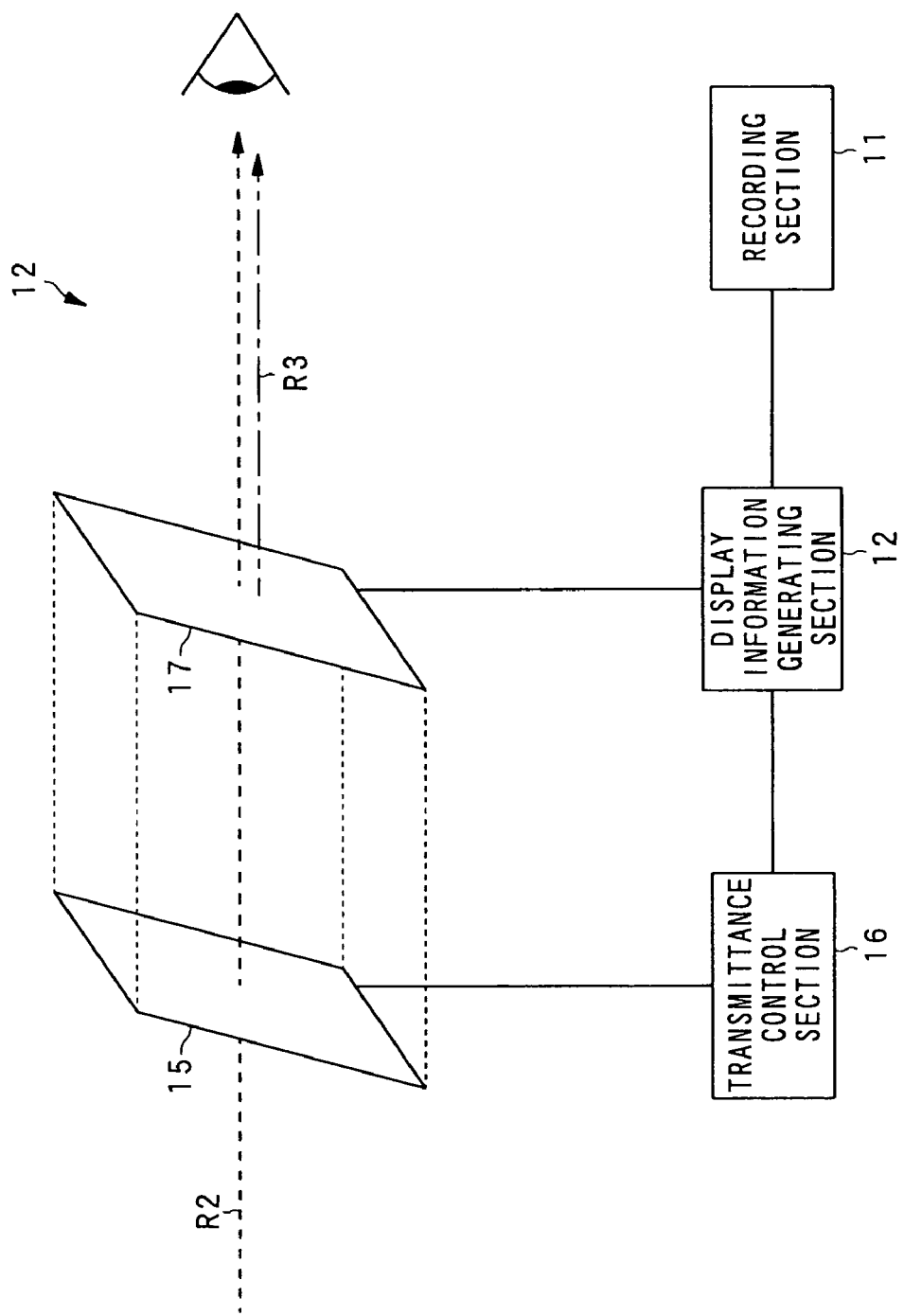
FIG. 9 is a block diagram illustrating a constitution of an information display apparatus I2 according to a modified example 3 of the first embodiment.

FIG. 9 illustrates a constitution of the information display apparatus I2 according to this modified example. In FIG. 9, the elements similar to those in FIG. 1 are designated by the same reference symbols. Therefore, the elements designated by the same reference symbols as those shown in FIG. 1 have the same constitutions as those in the first embodiment and perform the same operations unless otherwise specified.

The information display apparatus I2 according to the first embodiment adopts the constitution such that the information to be given to the user, namely, the object is projected by using the combiner 14 and the projector 13. On the contrary, in the information display apparatus I2 according to this modified example, a display panel 17 is provided instead of the comber 14 and the projector 13, and various objects are tried to be displayed on the display panel 17.

The display panel 17 is composed of a self-luminous type display apparatus which transmits a part of the external light R2 like a transmission type organic EL panel. When image data are supplied from the display information generating section 12, the display panel 17 outputs display light R3 corresponding to the image data. As a result, the transmitted light of the external light R2 and the display light R3 are combined via the display panel 17 so as to be viewed by the user.

In order to secure the visibility of the objects to be displayed on the display panel 17, even in the information display apparatus I2 according to this modified example, the function for reducing the transmittance of cells corresponding to the object display region is realized. The specific constitution of the light control panel 15 is similar to those in FIGS. 4 and 5.

Further, when the constitution using the display panel 17 is adopted, if cells corresponding to respective pixels on the display panel 17 cannot be specified by the transmittance control section 16, the transmittance of the cells corresponding to the display region of the information to be given to the user (object) cannot be reduced. For this reason, when the light control panel 15 and the display panel 17 are provided, it is necessary to set a position relationship between both the panels in order to enable the predetermined pixels to be related to each cell.

On the other hand, in the information display apparatus I2 according to the modified example, since the display panel 17 is driven based on the image data generated in the display information generating section 12, it is not necessary to consider the corresponding relationship between the coordinate (x', y') on the liquid crystal panel installed in the projector 13 and the coordinate (x, y) on the combiner 14 like the first embodiment. On the other hand, even when such a constitution is adopted, it is necessary to specify the cells corresponding to the display position of the object.

For this reason, in the information display apparatus I2 according to this modified example, the xx' translation table is not recorded in the recording section 11, and only the xX translation table and the cell specifying table are recorded. The method of specifying the cells when an image corresponding to each frame is displayed based on the image data is similar to that in the first embodiment.

According to this modified example, for example, even when the object display method using the transmittance type organic EL panel as the display panel 17 is adopted, the transmittance of the light control panel 15 is reduced so that the visibility of the object displayed on the display panel 17 can be secured.

The modified example, explains, for example, the form that the self-luminous type display apparatus such as the transmittance type organic EL panel is used as the display panel 17. However, the display panel 17 may requires, for example, a light source like a transmission type liquid crystal panel. In the case where such a constitution is adopted, when the transmittance of the light control panel 15 is reduced so that the transmission light amount of the external light R2 is reduced, the object cannot be viewed. Therefore, in the case where such a constitution is adopted, a half mirror is formed on one surface of the light control panel 15, and the surface where the mirror is formed is opposed to the display panel 17. Separately from the half mirror, it is necessary to provide a light source, emit a light beam output from the light source to the half mirror and allow the user to view the display image on the liquid crystal panel by means of its reflected light.

[2] Second Embodiment

Figure 10:
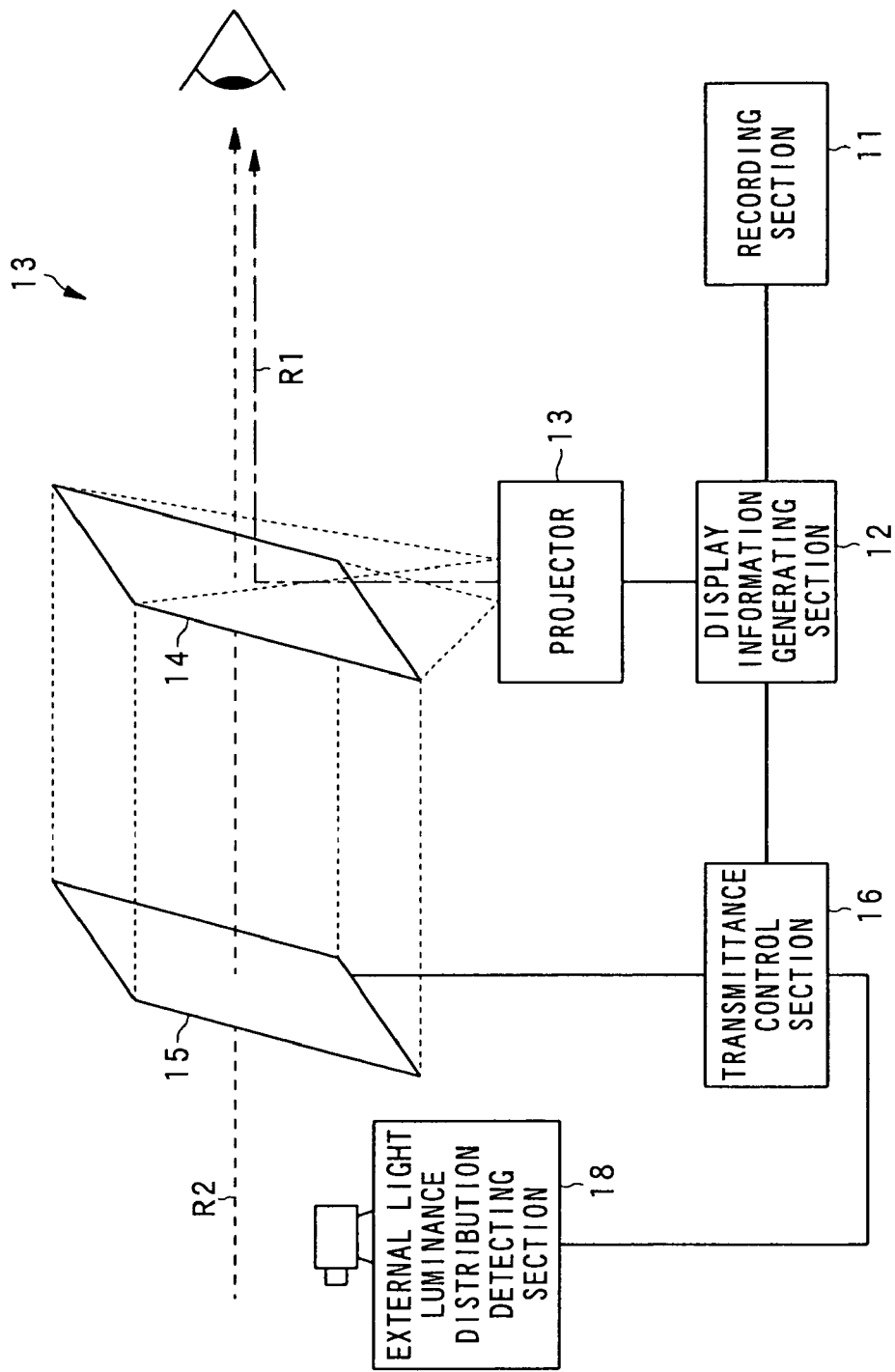
FIG. 10 is a block diagram illustrating a constitution of an information display apparatus I3 according to a second embodiment.

FIG. 10 is a block diagram illustrating a constitution of the information display apparatus I3 according to the embodiment. In FIG. 10 the elements similar to those in FIG. 1 are designated by the same reference symbols. Therefore, the elements designated by the same reference symbols as those of the elements shown in FIG. 1 have the same constitutions as those in the first embodiment, and they perform the same operations unless otherwise specified.

The information display apparatus I according to the first embodiment reduces the transmittance of cells corresponding to the display position of the information to be given to the user regardless of the luminance of the external light R2 so as to secure the visibility of the information. Under the circumstance such that the luminance of the external light R2 is low, however, even when the transmittance of the light control panel 15 is not reduced, the visibility of the information can be secured. On the other hand, for example, in the case of nighttime, it can be assumed that the luminance of the external light R2 becomes high only on a part of the combiner due to the influences of street lamps, headlights of vehicles. Therefore, the information display apparatus I3 according to the embodiment adjusts the transmittance of the light control panel 15 according to the luminance of the external light R2, and thus improves the visibility of the object corresponding to the information to be given to the user.

In order to realize such a function, the information display apparatus I3 according to the embodiment is provided with the respective elements shown in FIG. 1 and an external light luminance distribution detecting section 18. The external light luminance distribution detecting section 18 has a camera which is provided on an incident surface side of the external light R2 with respect to the light control panel 15, namely, behind the light control panel 15 viewed from the user, and detects the luminance of the external light R2 incident to the cells of the light control panel 15, namely, luminance distribution of the external light R2 incident to the light control panel 15 based on the video picture imaged by the camera.

The specific providing position and imaging range of the camera are arbitrary. For example, the camera is provided so that its field angle is set in order to be capable of imaging the entire surface of the light control panel 15, images the incident surface side of the external light R2 on the light control panel 15, and may calculate the luminance distribution of the external light R2 based on the reflected light amount on the light control panel 15. Further, the opposite direction to the light control panel 15 is imaged by the camera, and the luminance distribution of the external light R2 may be calculated based on the imaged video picture.

In order to calculate the luminance of the external light R2 incident to the cells based on the video picture imaged by the camera, it is necessary that the imaged video pictures are related to the cell numbers on the light control panel 15. In the embodiment, therefore, a table where the positions on the video pictures imaged by the camera are related to the cell numbers on the light control panel 15 is recorded in the recording section 11, and the external light luminance distribution detecting section 18 calculates the luminance of the external light R2 on the cells based on the table. The calculated result is output to the transmittance control section 16.

On the other hand, the transmittance control section 16 specifies the cell numbers based on the coordinate (x, y) group supplied from the display information generating section 12, and calculates the luminance of the external light R2 incident to the cells with the specified numbers based on the data supplied from the external light luminance distribution detecting section 16 so as to control the transmittance of the light control panel 15 based on the calculated result.

At this time, the method of specifying cells whose transmittance should be reduced by the transmittance control section 16 based on the coordinate (x, y) group supplied from the display information control section 12 and the process which is executed in the projector 13 based on the image data and the coordinate (x, y) group supplied from the display information generating section 12 are similar to those in FIG. 6. At this time, the method of controlling the transmittance by means of the transmittance control section 16 is arbitrary, and for example, the following methods can be adopted.

<Method a>

In this method, a threshold of the luminance is preset, and when the luminance of the external light R2 incident to the cells corresponding to the display region of the object exceeds the threshold, the light control panel 15 is driven so as to reduce the transmittance of the cells.

<Method b>

In this method, the transmittance of the light control panel 15 is controlled so that the luminance of the external light R2 transmitting through the light control panel 15 obtains a constant value on the cells. When such a constitution is adopted, however, it is necessary to examine a relationship between the electrodes of the light control panel 15, an applied voltage and the transmittance in advance, and make a control so that voltages corresponding to the transmittance to be set are applied to the electrodes corresponding to the cells.

The information display apparatus I3 according to the embodiment further has the external light luminance distribution detecting section 18 which detects the luminance of the external light R2 incident to the light control panel 15, and the transmittance control section 16 reduces the transmittance of the external light R2 on the light control panel 15 according to the luminance detected by the external light luminance distribution detecting section 18. With this constitution, since the transmittance of the light control panel 15 is controlled according to the luminance of the external light R2, only when the transmittance should be reduced, it is reduced, thereby reducing the power consumption.

The information display apparatus I3 according to the embodiment adopts the constitution using the combiner 14 and the projector 13. Also in the embodiment, however, like the modified example 3 of the first embodiment, the constitution having the display panel 17 provided in it instead of them can be adopted.

Further, in the information display apparatus I3 according to the embodiment, the external light luminance distribution detecting section 18 is provided with the camera, and the luminance of the external light R2 according to the coordinate values is calculated so that the luminance distribution on the combiner 14 is calculated. However, in the case where the luminance distribution does not have to be calculated, a light meter is used instead so as to be capable of control the transmittance uniformly according to the detected result of the light meter.

[3] Third Embodiment

The second embodiment adopts the constitution having the camera provided in it on the incident surface side of the external light R2 with respect to the light control panel 15, and the transmittance on the light control panel 15 is controlled based on the luminance of the external light R2 incident to the light control panel 15. On the contrary, the information display apparatus 14 according to the embodiment controls the transmittance of the light control panel 15 based on a video picture actually viewed by the user, namely, the video picture viewed by the user obtained by combining the external light R1 transmitting through the combiner 14 and the light beam R1 projected onto the combiner 14.

Figure 11:
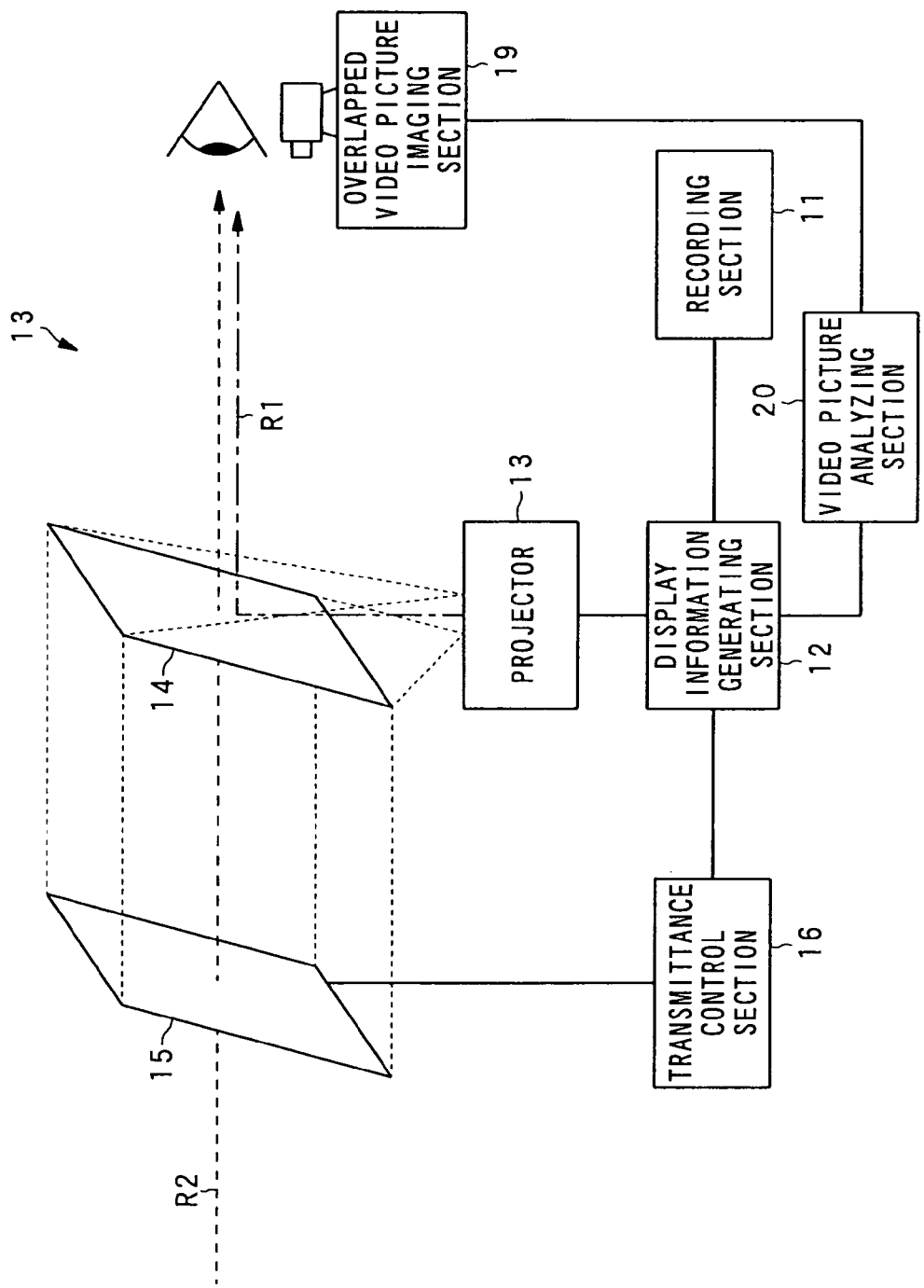
FIG. 11 is a block diagram illustrating a constitution of an information display apparatus I4 according to a modified example of the second embodiment.

The constitution of the information display apparatus I4 having such a function is shown in FIG. 11. In the drawing, the elements similar to those in FIG. 1 are designated by similar reference symbols. As shown in FIG. 11, the information display apparatus I4 according to the embodiment is provided with the elements shown in FIG. 1 and an overlapped video picture imaging section 19 and a video image analyzing section 20.

The overlapped video picture imaging section 19 has a camera provided on the viewing position of the user, and a field angle of the camera is set so that the entire surface of the combiner 14 can be imaged. Data corresponding to the video picture imaged by the camera are supplied from the overlapped video picture imaging section 19 to the video picture analyzing section 20 so as to be analyzed in the video picture analyzing section 20.

The video picture analyzing section 20 evaluates the visibility of the object on the combiner 14 based on the data supplied from the overlapped video picture imaging section 19. Specifically, the video picture analyzing section 20 executes the following process.

The following process is one example of the specific process for evaluating the visibility of the information, and the process executed by the video picture analyzing section 20 is not necessarily limited to this.

The video picture analyzing section 20 executes an edge detecting process based on the data supplied from the overlapped video picture imaging section 19, and creates a line image from the image according to the data. At this time, the video picture analyzing section 20 calculates a difference in brightness between the respective pixels included in the data and adjacent pixels. When the difference has a constant value or larger, it is set to "0", and when the difference has the constant value or lower, it is set to "1", so that the image corresponding to the data is binarized (hereinafter, the data corresponding to the binarized image is "line image data"). The "line drawing process" in "Claims" includes, for example, "a process for generating the line image data".

Further, at this time, the video picture analyzing section 20 acquires the image data to be supplied from the display information generating section 12 to the projector 13, and executes the edge detecting process on the image data so as to generate a line image. The video picture analyzing section 20 compares two line image data for the respective cells including the coordinate having the object displayed on it, and calculates unconformity T corresponding to the respective cells. The unconformity T is a marker showing conformity of the line images, and is calculated according to the following formula.

$$\text{Unconformity} = \frac{\sum_{1}^{n} |Wi - Zi|}{n} \quad \text{(Formula 2)}$$

In the (Formula 2), "n" means the number of pixels included in the cells whose unconformity T is to be calculated, and "W" and "Z" each mean binarized values of the brightness of each pixel in the video picture imaged in the overlapped video picture imaging section 19, and "Z" means a binarized value of the brightness of each pixel in the image corresponding to the image data generated in the display information generating section 16.

In general, in a state that the visibility of the object included in the image is good, the conformity of both the line images becomes good, and the number of the pixels where the calculated value of (Wi−Zi) is "0" increases. On the contrary, in a state that the visibility of the object included in the image is not good, since the binarized-values of the pixels do not conform, the number of the pixels where the calculated value of (Wi−Zi) is "1" increases.

Therefore, it is expected that as the calculated value of the unconformity T becomes larger, the visibility of the object becomes worse. Therefore, the video picture analyzing section 20 in this modified example compares the calculated result of the unconformity T with a predetermined threshold, and when the calculated value is larger than the threshold, the transmittance of the cells corresponding to the unconformity T is to be reduced. When a determination is made whether the transmittance of each cell is to be reduced in such a manner, the video picture analyzing section 20 outputs a signal showing the determined result to the transmittance control section 16, and only when the determined result represented by the signal shows that the transmittance should be reduced, the transmittance control section 16 reduces the transmittance of the cells corresponding to the display region of the object.

However, when such a constitution is adopted, the coordinate of the image data generated in the display information generating section 12, namely, the coordinate (x, y) on the combiner 14 should be related to the pixels on the video picture imaged by the camera. For this reason, in the case of the embodiment, the table where the pixels are related to the (x, y) coordinates in advance is recorded in the recording section 11, and the video picture analyzing section 20 calculates a difference of the line images based on this table.

The information display apparatus I4 according to the embodiment further has the overlapped video picture imaging section 19 which images the combiner 14 having an object displayed on it, and the video picture analyzing section 20 which calculates a difference between a brightness component corresponding to the pixels included in the display range of the object in the data corresponding to the imaged video picture and in its vicinity range and a brightness component in the range in the image data including the object so as to generate information representing the viewing state of the information from the user based on the difference value. The transmittance control section 16 specifies the cells whose transmittance of the visible light beam on the light control panel 15 is reduced based on the information generated in the video picture analyzing section 20 so as to reduce the light transmittance of the cells.

With this constitution, since the determination is made whether the transmittance of the light control panel 15 is reduced based on the data corresponding to the video picture imaged by the overlapped video picture imaging section 19, a determination is made whether the transmittance is reduced according to the display state of the object actually viewed by the user so that the visibility of the object by the user can be secured.

[4] Modified Example of the Information Display Apparatus of the Invention

Application examples in the case where the information display apparatuses I, I2, I3 and I4 explained in the above embodiments are applied to various apparatuses are explained below. The following explains the case where the information display apparatus I is applied to various apparatuses for convenience.

[4.1] First Application Example

Figure 12:
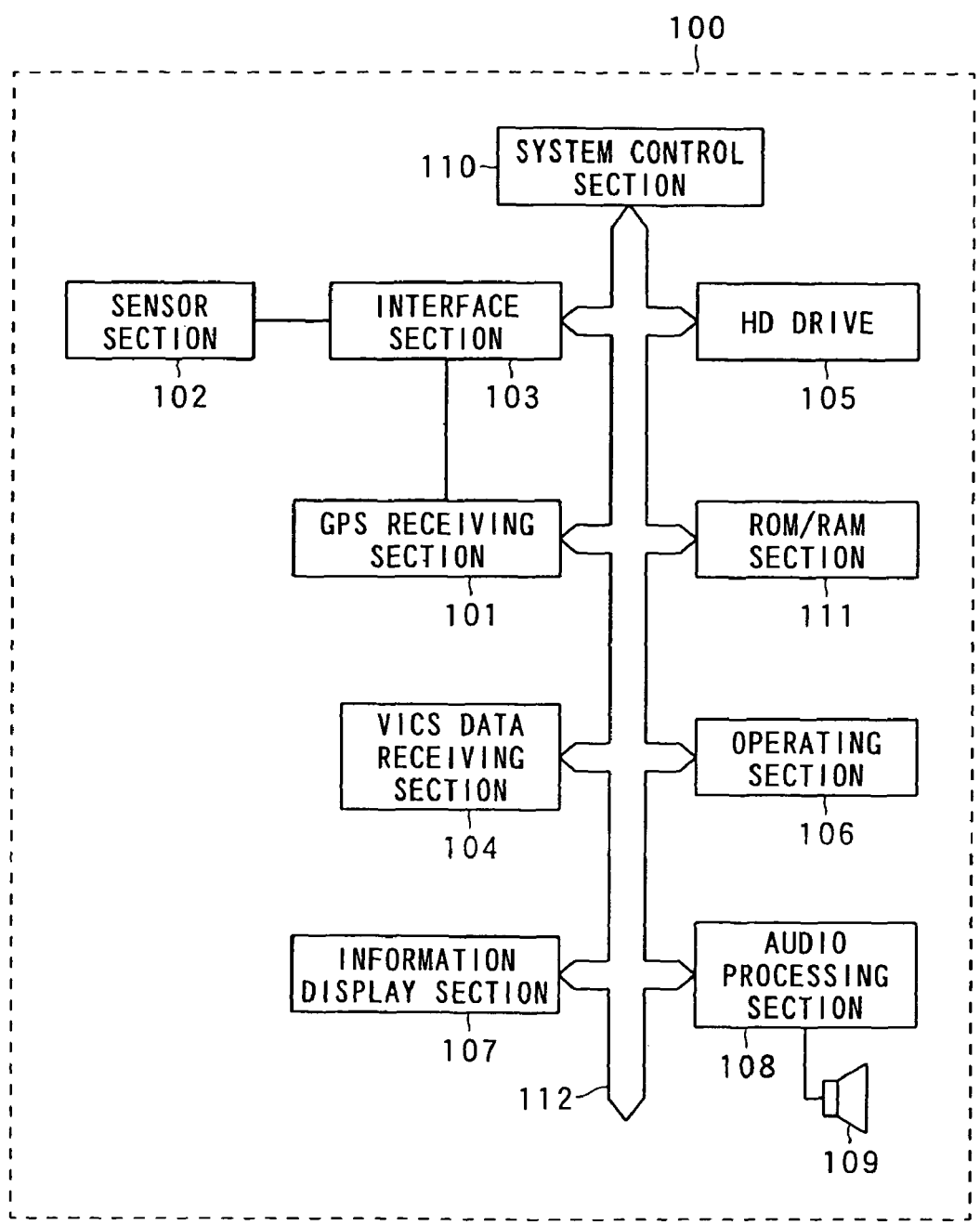
FIG. 12 is a block diagram illustrating a constitution of a navigation apparatus 100 according to an application example 1.

FIG. 12 is a block diagram illustrating a constitution of a navigation apparatus 100 according to this application example. As shown in FIG. 12, the navigation apparatus 100 according to this application example has a GPS (Global Positioning System) receiving section 101, a sensor section 102, an interface section 103 (hereinafter, abbreviated as "the interface" is "I/F"), a VICS (Vehicle Information Communication System) data receiving section 104, an HD drive 105, an operating section 106, an information display section 107, an audio processing section 108, a speaker 109, a system control section 110, a ROM (Read Only Memory)/RAM (Random Access Memory) section 111, and a data bus 112 which connects these respective elements.

In this application example, the information display apparatus I is applied to the information display section 107 of the navigation apparatus 100. In this navigation apparatus 100, the light control panel 15 and the combiner 14 are provided onto the entire surface of the windshield of a vehicle so as to be overlapped on an actual landscape viewed by a user (driver) through the windshield, and an object such as an arrow for guiding a route is projected onto the combiner 14.

The constitution of the navigation apparatus 100 according to the embodiment for realizing such a function is explained below.

The GPS receiving section 101 receives a GPS radio wave sent from a geodetic satellite, and calculates longitude/latitude corresponding to a current position of the vehicle based on the received GPS radio wave so as to output the calculated longitude/latitude as GPS data to the I/F section 103. The sensor section 102 has various sensors for detecting a running speed, a velocity and an azimuthal angle of the vehicle, and outputs running data corresponding to the detected results to the I/F section 103.

The I/F section 103 calculates the current position of the vehicle based on the running data input from the sensor section 102 and the GPS data input from the GPS receiving section 101, so as to output self vehicle position data corresponding to the calculated results to the system control section 110.

The VICS data receiving section 104 receives airwaves such as FM multiple broadcasting, and extracts VICS data included in the airwaves so as to output them to the system control section 110. VICS means a vehicle information and communication system, and the VICS data means vehicle and communication information such as traffic jam, accidents and traffic regulation.

The HD drive 105 has HD which is capable of rewriting information, and, for example, a three-dimensional pattern diagram viewed from the driver's viewpoint (hereinafter "driver's view map"), more specifically, a map obtained by three-dimensionally patterning a landscape viewed from the driver while the vehicles is moving, more specifically, or map data whose elements are data such as a polygon, a polyline and a text for displaying a landscape and a road in a plane map, and object data such as a polygon for displaying objects such as an arrow for informing the user of a road, and data for searching a spot are recorded in the HD. In this application example, the recording section 11 shown in FIG. 1 is replaced by the HD.

The operating section 106 is composed of a remote control apparatus having various keys such as a ten key and a cursor key, and outputs a control signal corresponding to an input operation by the user (driver or fellow passenger) to the system control section 110. The audio processing section 108 generates an audio signal under the control by means of the system control section 110, and amplifies the generated audio signal via the speaker 109. The navigation apparatus according 100 according to the embodiment notifies the user of an advancing direction of the vehicle at the next intersection or notifies the user of a jam situation or a traffic stop situation on the set route according to the function of the audio processing section 108.

The system control section 110 is composed of mainly CPU (Central Processing Unit), and includes various input/output ports such as a GPS receiving port, a key input port and a display control port and controls the entire function of the navigation apparatus 100. At the time of such a control, the system control section 100 reads control programs recorded in the ROM/RAM section 111 so as to execute respective processes, and temporarily retains the data which are being processed in the ROM/RMM section 111.

For example, the system control section 110 executes a compensating process such as map matching based on the data recorded in HD, determines a spot as destination according to an input operation on the operating section 106, so as to execute a route setting process for setting a route from the vehicle current position to spot as the destination.

Further, when the route from the vehicle current position to the destination is set in the route setting process, the system control section 110 controls the audio processing section 108 so as to output a guidance sound, and controls the information display section 107 so that the object such as an arrow showing the vehicle advancing direction is overlapped on a landscape actually viewed by the driver and is projected onto the combiner 14.

At this time, the system control section 110 searches the map data recorded in HD of the HD drive 105 based on the self vehicle position data supplied from the I/F section 103, so as to read the map data about a driver's view map corresponding to the vehicle current position. The system control section 110 calculates a road shape actually viewed by the user and the coordinate (x, y) group with which the road is viewed on the combiner 14 based on the map data, and determines a shape of the arrow to be displayed based on the calculated road shape and the route set in the route setting process. The arrow shape and the coordinate (x, y) group determined in such a manner are output to the information display section 107, and the image data are generated on the information display section 107 according to the information.

The specific method of calculating the road shape and the coordinate (x, y) group in the system control section 110 is arbitrary. In this application example, when the driver's view map is displayed on the entire surface of the combiner 14, the map data are generated so that the map matches with the landscape actually viewed by the driver, and the coordinate (x, y) group that the road is viewed when the map is displayed on the combiner 14, and the road shape are calculated.

The information display section 107 has the similar constitution to that of the information display apparatus I shown in FIG. 10, and the combiner 14 and the light control panel 15 consisting the information display section 107 are formed on the entire surface of the windshield of the vehicle. Further, in this application example, the field angle of the projector 13 is set so that an image is projected to the entire region of the light control panel 15 provided on the entire surface of the windshield of the vehicle.

In the navigation apparatus 100 according to the modified example, when the case where information for guiding a route is actually presented to the user, the display information generating section 12 reads the object data recorded in HD, and generates the object to be presented to the user, namely, image data where the arrow for guiding the route is drawn based on the object data and the information supplied from the system control section 110.

The specific processing contents at the time of displaying the arrow (object) for guiding the route in the navigation apparatus 100 according to this application example are explained below. When the user performs an input operation for setting destination on the operating section 106, the system control section 110 executes the route setting process according to this input operation so as to calculate the route from the vehicle current position to the destination specified by the user.

Figure 13:
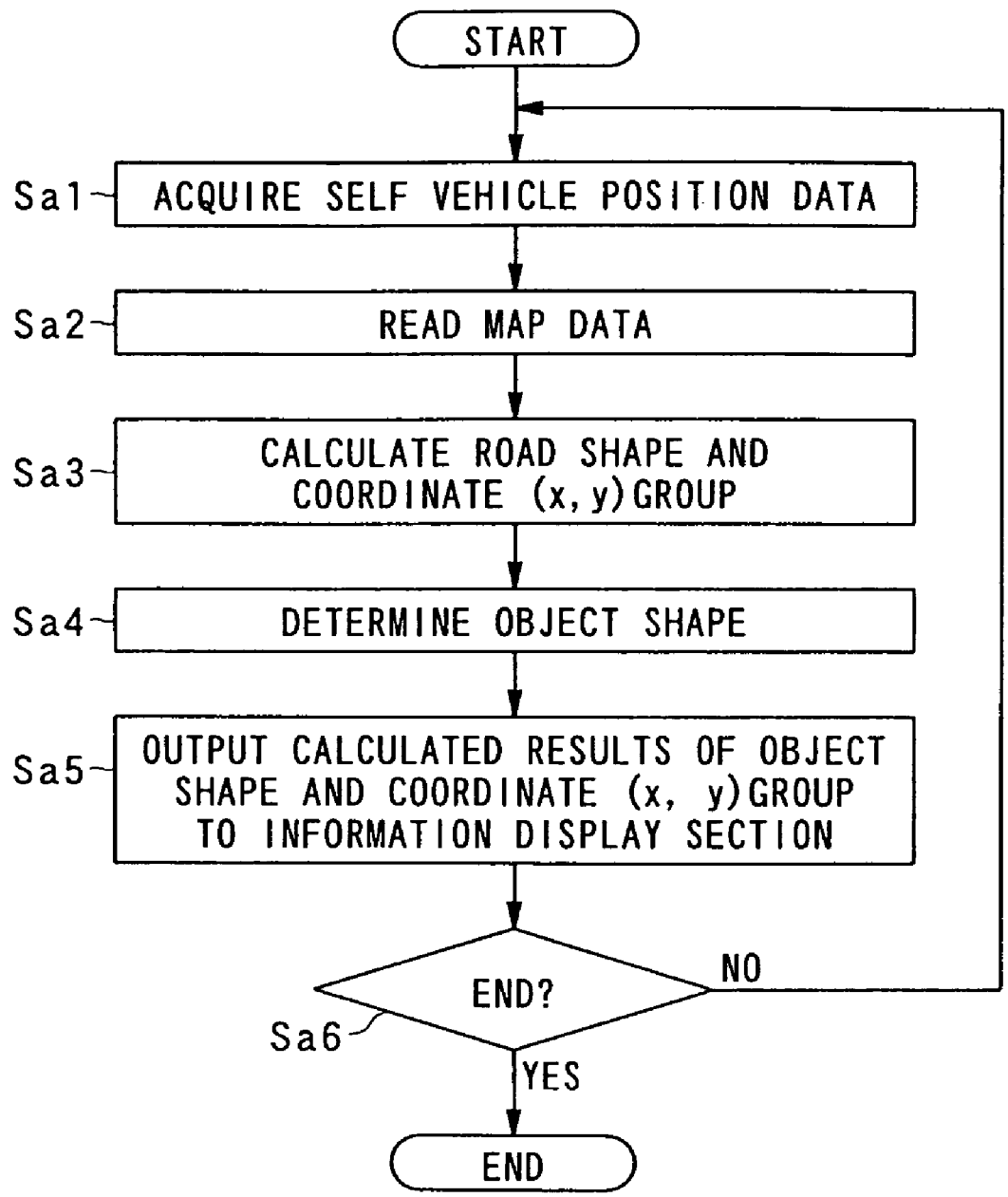
FIG. 13 is a flowchart illustrating a process executed by a system control section 110 of the navigation apparatus 100 according to the application example 1.

When the route setting is completed in such a manner, the system control section 110 starts the process for the route guiding shown in FIG. 13. FIG. 13 is a diagram illustrating a subroutine executed by the system control section 110 at the time of the route guiding.

In this process, the system control section 110 firstly acquires the self vehicle position data supplied from the I/F section 103 (step Sa1), and reads the map data about the driver's view map corresponding to the self vehicle position data from the HD drive 105 (step Sa2). At this time, the system control section 110 specifies the vehicle current position based on the self-vehicle position data and reads the map data corresponding to the current position.

The system control section 110 calculates the road shape viewed by the driver in the vehicle current position and the coordinate (x, y) group based on the read map data and the self vehicle position data (step Sa3), and thereafter determines an object to be displayed on the combiner 14, namely, the arrow shape based on the calculated road shape (step Sa4). After the system control section 110 outputs the determined object shape and the coordinate (x, y) group to the information display section 107 (step Sa5), it is brought into a state that a determination is made whether the process for the route guiding is ended (step Sa6), and when the determination is made as "yes", it ends the process, but when the determination is made as "no", it again repeats the process at steps Sa1 to Sa6.

On the other hand, when information such as the object shape is supplied from the system control section 110, the display information generating section 12 of the information display section 107 reads the object data from the HD drive 105, and generates image data corresponding to an image to be projected to the combiner 14 (including the arrow for the route guiding) based on the object data. At this time, the display information generating section 12 determines the arrow shape based on the object shape supplied from the system control section 110, and specifies the position having the object to be displayed on it based on the coordinate (x, y) group.

The image corresponding to the image data generated in such a manner is projected onto the combiner 14 by the process similar to that shown in FIG. 6, and accordingly, the transmittance of the light control panel 15 is reduced. Such a series of the process is repeated, the arrow shapes to be displayed are sequentially determined in new vehicle positions so as to be projected onto the combiner 14.

According to the navigation apparatus 100 in the embodiment, the information such as the arrow for route guiding is overlapped with a real landscape viewed by the driver in the vehicle current position and can be displayed, so that the virtual reality can be realized and thus the user's convenience can be secured.

When the light control panel is provided onto the entire surface of the windshield of an automobile, the transmittance control section 16 controls the transmittance of the light control panel 15 based on the detected result in the external light luminance distribution detecting section 18, so that the function as a sun visor can be realized. With such a constitution, the light control panel 15 can be used as, for example, a glare-proof apparatus in a region in which light such as a headlight of an oncoming car or morning sun cannot be shielded by the sun visor.

Further, the map data corresponding to the driver's view map in the embodiment is generated so as to match with a landscape viewed by the driver, but the data can be further generated so as to match with a landscape viewed in a front passenger seat or a rear seat.

Further, this application example explains the case where the arrow for the road guiding is overlapped with the road viewed by the driver so as to be displayed, but the information to be overlapped and displayed is not limited to the arrow for the road guiding, and thus for example, a name of a building and a name of an intersection may be overlapped with a real building or the like viewed by the driver and may be displayed. Even this case is similar to the first application example except for a point that a subject, from which a shape or the like is extracted in the system control section 110, is other than roads.

Further, in this application example, at every time of displaying the arrows, the system control section 110 adopts the constitution which calculates the shapes and the display positions of the arrows based on the map data, but the calculated results may be put into a table in advance so as to be retained.

[4.1.1] Modified Example of the First Application Example

The first application example adopts the constitution where the map data corresponding to the driver's view map are generated so as to match with the landscape viewed by the driver of the vehicle in advance, and the road shape to be viewed by the driver and the coordinate (x, y) on the combiner 14 where the road is displayed are determined by using the map data. However, the road shape to be viewed by the driver and the coordinate (x, y) on the combiner 14 where the road is displayed can also be determined without preparing the map data.

For example, the camera is provided to the vicinity of the user's viewpoint, and a landscape viewed from the user is recognized based on the image imaged by the camera, so that the arrow can be displayed on the position where the user can view the intersection.

In this case, as the method of recognizing the real landscape based on the image imaged by the camera, for example, a feature point on the image input from the camera is extracted, a parameter is set based on the feature point, and the landscape on each image may be recognized based on the parameter (for example, the article of International Institute of Advanced Industrial Technology Science and technology "A Natural Feature-Based 3D Object Tracking Method for Wearable Augmented Reality").

Further, in the case of adopting such a method, data corresponding to each frame imaged by the camera are binarized, and a difference between corresponding pixels in each frame is obtained, so that a moving matter such as human or animal is detected and for example, an object, which indicates a dangerous state, can be overlapped and displayed on the matter. In this case, a relative moving speed of the matter with respect to the vehicle is calculated, so that a determination can be made whether each matter moves.

[4.2] The Other Application Example

In addition to the above application example 1, the information display apparatus I, I2, I3 and I4 can be applied to a head-mount display, for example. In this case, the light control panel 15 and the combiner 14 of the information display apparatus I3 should be formed into a spectacle shape. In this case, for example, an external device I/F such as IEEE1394 is provided to the display information generating section 12, and the display information generating section 12 is connected to an external device such as the navigation apparatus via the external device I/F, so that the display information generating section 12 may generate image data based on data input from the external device. Also in this case, the similar control is made so that the transmittance of the cells corresponding to the display region of the information to be given to the user can be reduced.

The invention claimed is:

1. An information display apparatus which displays notification information to be given to a user, comprising:
    a display device which is composed of a base material for transmitting a visible light beam and is provided with a display surface for displaying the notification information with it being opposed to an incident surface of the visible light beam;
    a light control device which is arranged so as to be overlapped with the incident surface of the display device, controls luminance of the visible light beam incident to the incident surface and is formed by a base material having transparency, and changes light transmittance for each region obtained by dividing a range overlapped with the display device;
    a display control device which generates data including the notification information as image data and controls display of the notification information in the display device;
    a specifying device which specifies a display position of the notification information on the display device and specifies the region of the light control device corresponding to the display position;
    a transmittance control device which controls the light control device so as to reduce the light transmittance in the specified region;
    an imaging device which images the display device having the notification information displayed on it; and
    a video picture analyzing device which calculates a difference between a brightness component corresponding to pixels included in a display range of the notification information in video picture data corresponding to a video picture imaged by the imaging device and its vicinity range and a brightness component in the range in the image data including the notification information, so as to generate viewing information representing a viewing state of the notification information from the user based on the difference value,
    wherein the specifying device specifies the region on the light control device based on the viewing information, the transmittance control device reduces light transmittance in the specified region, and
    wherein, the video picture analyzing device executes edge detecting processes based on the data supplied from an overlapped video picture imaging section and the image data supplied from the display control device, and creates two line image data respectively according to the each data, and compares two line image data, and calculates unconformity T corresponding to respective cells composing each data, and compares the calculated result of the unconformity T with a predetermined threshold, and when the calculated value is larger than the threshold, the transmittance control device reduces the transmittance of the cells corresponding to the unconformity T.

2. The information display apparatus according to claim 1, wherein the video picture analyzing device executes a line drawing process on the video picture data corresponding to the video picture imaged by the imaging device and the image data so as to calculate the difference value for each pixel composing each data, and generates the viewing information using the difference value.

3. The information display apparatus according to claim 2, wherein the video picture analyzing device calculates the unconformity T between the video picture data and the image data based on the difference value, and generates the viewing information based on the unconformity T, the specifying device reduces the transmittance in the region where the unconformity T shown by the viewing information exceeds a predetermined threshold.

4. The information display apparatus according to claim 1, wherein when the light control device is arranged so as to be separated from the incident surface of the display device, the specifying device has a table for storing information for relating the region on the light control device viewed by the user to the display position in it for each of different viewing positions, and after the viewing position of the user is specified, it uses the table corresponding to the viewing position so as to specify the region of the light control device corresponding to the display position of the notification information on the display device.

5. The information display apparatus according to claim 1, wherein when the light control device is arranged so as to be separated from the incident surface of the display device, the specifying device generates information for relating the display position on the display device to the region on the light control device overlapped with the display position and viewed by the user according to a distance from the user's viewing position to the light control device and the display device, and specifies the region on the light control device corresponding to the display position of the notification information on the display device based on the information.

6. The information display apparatus according to claim 1, wherein the light control device is composed of a liquid crystal panel having at least two or more transparent substrates, a plurality of transparent electrodes formed on counter surfaces of the substrates into a shape corresponding to the region and a liquid crystal material filled between both the substrates, the transmittance control device controls application of a voltage to the transparent electrodes so as to reduce the light transmittance in the specified region in the light control device.

7. The information display apparatus according to claim 1, further comprising:
    a projecting device which emits a light beam including the notification information to the display surface of the display device based on the image data generated in the display control device,
    wherein the display device reflects the light beam on a reflection surface formed on the display surface so as to display the notification information.

8. The information display apparatus according to claim 1, wherein the display device is composed of a self-luminous display element or an incident light transmitting display element.

9. The information display apparatus according to claim 1, further comprising:
    a luminance detecting device which detects luminance of the visible light beam incident to the display device,
    wherein the transmittance control device reduces transmittance of the visible light beam in the light control device according to the luminance detected by the luminance detecting device.

10. The information display apparatus according to claim 9, wherein the luminance detecting device includes:
  an imaging device which images an incident state of the visible light beam with respect to the light control device; and
  a calculating device which calculates luminance distribution of the visible light beam incident to the light control device based on video picture data corresponding to a video picture imaged by the imaging device, the transmittance control device calculates the luminance of transmitted light corresponding to the region whose transmittance should be reduced based on the calculated result of the luminance distribution, and when the luminance exceeds a predetermined threshold, reduces the transmittance of the region.

11. The information display apparatus according to claim 9, wherein the luminance detecting device includes:
  an imaging device which images an incident state of the visible light beam with respect to the light control device; and
  a calculating device which calculates luminance distribution of the visible light beam incident to the light control device based on video picture data corresponding to a video picture imaged by the imaging device, the transmittance control device controls the light control device based on the calculated result of the luminance distribution so as to set the luminance in all the regions to a constant value.

12. A navigation apparatus which displays route guiding information necessary for route guiding due to a movement of a mobile object, comprising:
  a display device which is composed of a base material for transmitting a visible light beam and is provided with a display surface for displaying the route guiding information with it being opposed to an incident surface of the visible light beam;
  a light control device which is arranged so as to be overlapped with the incident surface of the display device, controls luminance of the visible light beam incident to the incident surface and is formed by a base material having transparency, and changes light transmittance in each of regions obtained by dividing a range overlapped with the display device;
  a recording device which records image data including the route guiding information in it;
  a display control device which controls display of the route guiding information in the display device based on the image data recorded in the recording device;
  a specifying device which specifies a display position of the route guiding information on the display device and specifies the region of the light control device corresponding to the display position;
  a transmittance control device which controls the light control device so as to reduce the light transmittance in the specified region;
  an imaging device which images the display device having the route guiding information displayed on it; and
  a video picture analyzing device which calculates a difference between a brightness component corresponding to pixels included in a display range of the route guiding information in video picture data corresponding to a video picture imaged by the imaging device and its vicinity range and a brightness component in the range in the image data including the route guiding information, so as to generate viewing information representing a viewing state of the route guiding information from the user based on the difference value,
  wherein the specifying device specifies the region on the light control device based on the viewing information, the transmittance control device reduces light transmittance in the specified region, and
  wherein, the video picture analyzing device executes edge detecting processes based on the data supplied from an overlapped video picture imaging section and the image data supplied from the display control device, and creates two line image data respectively according to the each data, and compares two line image data, and calculates unconformity T corresponding to respective cells composing each data, and compares the calculated result of the unconformity T with a predetermined threshold, and when the calculated value is larger than the threshold, the transmittance control device reduces the transmittance of the cells corresponding to the unconformity T.

13. The navigation apparatus according to claim 12, wherein when the light control device is arranged so as to be separated from the incident surface of the display device, the specifying device has a table for storing information for relating the region on the light control device viewed by the user to the display position in it for each of different viewing positions, and after the viewing position of the user is specified, it uses the table corresponding to the viewing position so as to specify the region of the light control device corresponding to the display position of the route guiding information on the display device.

14. The navigation apparatus according to claim 12, wherein when the light control device is arranged so as to be separated from the incident surface of the display device, the specifying device generates information for relating the display position on the display device to the region on the light control device overlapped with the display position and viewed by the user according to a distance from the user's viewing position to the light control device and the display device, and specifies the region on the light control device corresponding to the display position of the route guiding information on the display device based on the information.

15. The navigation apparatus according to claim 12, wherein when the recording device records the image data and also map data, it further includes a display contents determining device which predicts an actual video picture viewed from a passenger of the mobile object based on the map data, and determines a display position and a display shape of the route guiding information according to the predicted result, the display control device generates the image data based on the display shape and the display position determined in the display contents determining device.

16. The navigation apparatus according to claim 12, further comprising:
  an imaging device which images an actual video picture to be viewed by a passenger of the mobile object; and
  a display contents determining device which predicts an actual video picture to be viewed by the passenger based on video picture data corresponding to the video picture imaged by the imaging device, and determines a display position and a display shape of the route guiding information according to the predicted result,
  wherein the display control device generates the image data based on the display shape and the display position determined in the display contents determining device.

* * * * *